United States Patent
Tagawa et al.

(10) Patent No.: US 6,720,075 B2
(45) Date of Patent: Apr. 13, 2004

(54) MAGNETIC RECORDING MEDIUM AND MAGNETIC RECORDING MEDIUM DRIVER FOR THE MEDIUM WITH N-TYPE FERRIMAGNETIC RECORDING LAYER

(75) Inventors: Ikuya Tagawa, Kawasaki (JP); Koji Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/097,511

(22) Filed: Mar. 13, 2002

(65) Prior Publication Data
US 2002/0094454 A1 Jul. 18, 2002

Related U.S. Application Data (63) Continuation of application No. PCT/JP99/05375, filed on Sep. 30, 1999.

(51) Int. Cl.$^7$ .................................................. G11B 5/65
(52) U.S. Cl. ...................... 428/409; 428/694 T; 360/313
(58) Field of Search ......................... 428/694 T, 694 RE, 428/900, 653, 686, 409; 360/313

(56) References Cited

U.S. PATENT DOCUMENTS

| | | | | |
|---|---|---|---|---|
| 4,876,113 A | * | 10/1989 | Yasunaga et al. ............. | 427/130 |
| 5,344,706 A | * | 9/1994 | Lambeth et al. ............. | 428/336 |
| 5,353,268 A | * | 10/1994 | Hintz ...................... | 369/13.35 |
| 5,660,929 A | * | 8/1997 | Suzuki et al. ............... | 360/131 |
| 6,080,476 A | * | 6/2000 | Kanbe et al. ................ | 324/252 |
| 6,183,893 B1 | * | 2/2001 | Futamoto et al. ...... | 428/694 TS |
| 6,403,203 B2 | * | 6/2002 | Futamoto et al. ........ | 360/97.01 |
| 6,483,653 B1 | * | 11/2002 | Katayama et al. ............ | 360/59 |
| 6,500,530 B1 | * | 12/2002 | Sawamura et al. .......... | 428/212 |

FOREIGN PATENT DOCUMENTS

| | | | |
|---|---|---|---|
| JP | 02-227814 A | * | 9/1990 |
| JP | 9-231543 | | 9/1997 |
| JP | 10-135039 | | 5/1998 |
| JP | 471 527 | | 2/2002 |

OTHER PUBLICATIONS

English Translation of JP 02–227814–A (Fukuichi et al.).*
JPO Abstract Translation of JP–02–227814–A (Clipped Image No. JP402227814A).*
Hairston, D. and Kryder, M., IEEE Trans. Mag., 25(5), 1989, 3746–3748.*

* cited by examiner

*Primary Examiner*—Paul Thibodeau
*Assistant Examiner*—Kevin M. Bernatz
(74) *Attorney, Agent, or Firm*—Greer, Burns & Crain, Ltd.

(57) ABSTRACT

A magnetic recording medium stable against heat of which high density recording can be attained is provided by employing a magnetic material such that coercive magnetic force in a recording magnetic layer increases with temperature rise. The magnetic recording medium is one in which the recording magnetic layer in which magnetic recording is carried out comprises an N-type Ferrimagnetic material, and compensation temperature of this N-type Ferrimagnetic material is made to be higher than an operating temperature range in which the magnetic recording medium is used.

4 Claims, 5 Drawing Sheets

MAGNETIC RECORDING MEDIUM AND MAGNETIC RECORDING MEDIUM DRIVER FOR THE MEDIUM WITH N-TYPE FERRIMAGNETIC RECORDING LAYER

"This is a continuation of International PCT Application No. PCT/JP99/05375 filed Sep. 30, 1999, which was not published in English".

TECHNICAL FIELD

The present invention relates to a magnetic recording medium, more particularly, to a magnetic recording medium capable of performing high-density recording by improving thermal stability of recording magnetization. Furthermore, a vertical magnetic recording method is one in which magnetic recording is carried out by applying recording magnetization in a direction vertical to a surface of a magnetic recording medium (an easy axis of magnetization), and one of the promising technologies for excellent magnetic recording methods supporting a recent trend of high density recording.

BACKGROUND ART

Figure 1:
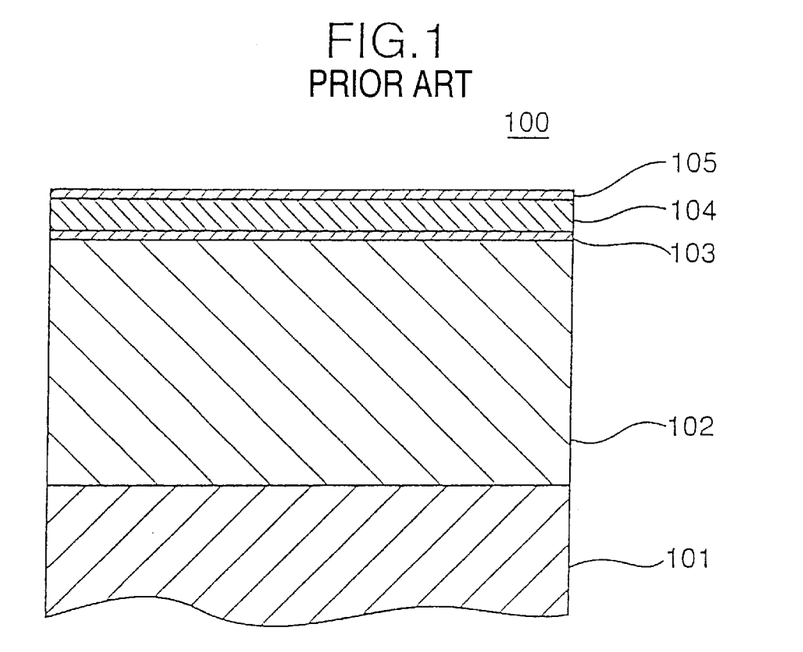
FIG. 1 is a diagram showing a configuration of principal elements of a common vertical magnetic recording medium in the prior art.

One example of a magnetic recording material will now be described, based on FIG. 1 showing a configuration of principal elements of a common vertical magnetic recording medium 100 in the prior art. As shown in FIG. 1, for example, the vertical magnetic recording medium 100 has a structure formed by laminating a soft magnetic underlying layer 102 consisting of nickel-iron, etc., a crystal controlling layer 103 consisting of chromium (Cr) and titanium (Ti), etc. laid on for crystal controlling, a vertical magnetic recording layer 104 consisting of an alloy containing cobalt such as cobalt-chromium (Co—Cr), etc. in which magnetic recording is carried out, and a protecting layer 105 consisting of hard DLC (Diamond Like Carbon), etc., in order from the bottom, on a non-magnetic substrate 101 consisting of aluminum, etc.

Herein, the underlying layer 102 is a layer laid on for improving recording sensitivity and this layer is not an essential layer for the vertical magnetic recording medium 100. Furthermore, in order to improve good crystallization and adhesion, a layer consisting of chromium or titanium, etc. may be formed before film formation of the respective magnetic layers.

In the vertical magnetic recording medium 100, for attainment of both high density recording and decrease of noise level, miniaturization and homogenization of magnetic particle diameters and elimination (segregation) of magnetic interaction between magnetic particles in the vertical magnetic recording layer 104, etc. are required and various investigations are made for them.

It is known that as the miniaturization and homogenization of the magnetic particle diameter and the elimination of the magnetic interaction between the magnetic particles in the vertical magnetic recording layer 104 are carried out, recording magnetization is destabilized by heat. Consequently, a design to produce the vertical magnetic recording medium 100 having large vertical coercive magnetic force Hc is required.

However, in the vertical magnetic recording medium 100 in the prior art, the vertical coercive magnetic force Hc was also decreased by heat causing a temperature rise.

This influence of the heat will now be described in detail. Since recording and reading (reproducing) are carried out in a vertical magnetic recording medium, it is designed so as to have, for example, approximately 2800 Oe as the maximum vertical coercive magnetic force Hc within a range in which magnetic recording is allowed.

Figure 2:
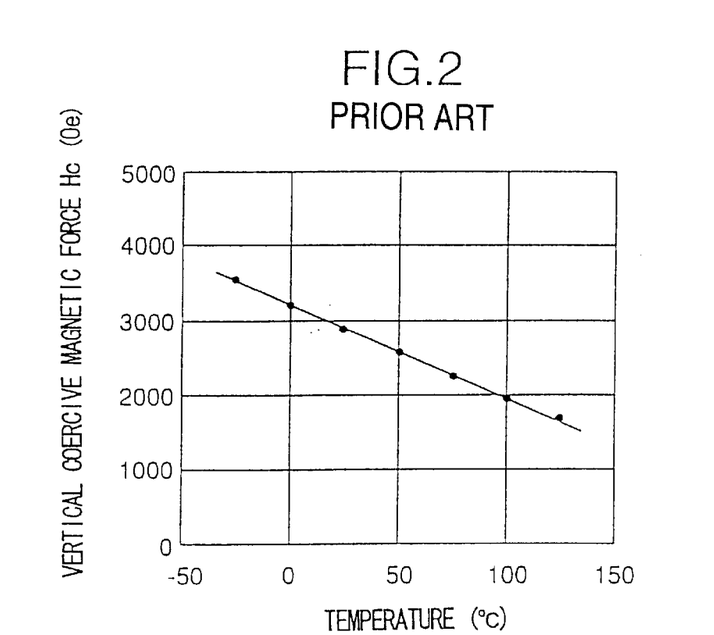
FIG. 2 is a diagram showing a relationship between temperature (° C.) and vertical coercive magnetic force Hc (Oe) with respect of a conventional common vertical magnetic recording medium in the prior art.

FIG. 2 is a diagram showing a relationship between temperature (° C.) and vertical coercive magnetic force (Hc) with respect to a common vertical magnetic recording medium in the prior art. As clearly shown in the figure, the vertical coercive magnetic force decreases with temperature rise. Hence it is recognized that recording magnetization of a vertical magnetic recording medium is destabilized by temperature rise.

Figure 3:
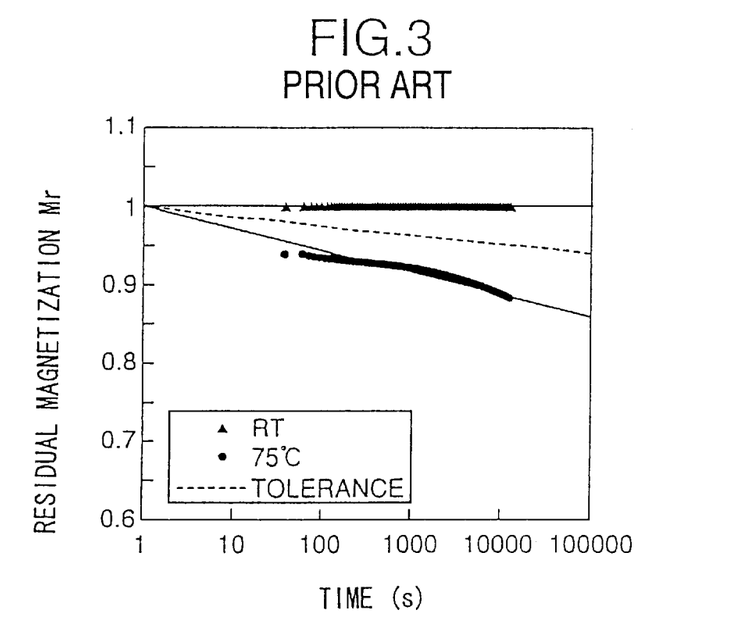
FIG. 3 is a diagram showing change of residual magnetization Mr with time at certain temperatures with respect to a vertical magnetic recording medium produced by eliminating the underlying layer from the vertical magnetic recording layer shown in FIG. 1.

Also, FIG. 3 is a diagram showing change of residual magnetization Mr with time at certain temperatures with respect to a vertical magnetic recording medium produced by eliminating the underlying layer 102 from the vertical magnetic recording medium 100 shown in FIG. 1. Herein, the vertical axis shows relative change, provided that the residual magnetization Mr in the vertical direction from the vertical magnetic recording layer 104 in an early stage is one. When one second after beginning of a measurement is defined as the time standard and the obtained data are extrapolated, the appearance of the change with time is shown. The filled triangle indicates at room temperature RT (approximately 25° C.) and the filled dot indicates at 75° C. that is assumed to be the guaranteed temperature of the vertical magnetic recording medium. The dashed line indicates a tolerance of temperature for maintaining a function of the vertical magnetic recording medium.

As clearly shown in FIG. 3, although the residual magnetization Mr hardly decreases at the room temperature and there is no problem, the decrease of the magnetization become significant and dips below the tolerance at 75° C.

The decrease of magnetization in a medium caused by temperature rise or heat as described above is a phenomenon known as the thermal fluctuation magnetic after effect or the thermal magnetic relaxation.

That is, magnetization within a magnetic particle in a single magnetic domain is stabilized such that various magnetic energies represented by an anisotropic energy are minimized at lower temperature. Such condition of the magnetization is conceptually like a condition on which an inner part surrounded by magnetic barrier $\Delta E$ is stabilized. Also, it is known that energy is added to a magnetization spin as thermal energy as temperature is raised and the magnetization comes to be in a disordered state as thermal energy kT (k is Boltzmann constant) is larger than the energy barrier $\Delta E$.

However, according to the statistical mechanics, even if the thermal energy is not so large, the thermal energy kT may randomly exceed the magnetic energy barrier $\Delta E$. The larger the thermal energy is, the smaller the thermal energy barrier $\Delta E$ is, and the longer elapsed time is, the more the probability increases. Usually, if temperature is constant, the magnetic energy barrier $\Delta E$ and the thermal energy kT are approximately constant. Hence, with respect to magnetization spins directed to one direction by means of magnetic recording, magnetization spins in the random state increase with time. Therefore, it seems that the magnetization decreases with time. This is a phenomenon referred to as the thermal magnetic relaxation.

In the case of the vertical magnetic recording medium, as the influence of the phenomenon is considered, the magnetic energy barrier $\Delta E$ strongly depends on vertical coercive magnetic force Hc along the vertical direction, and the higher the vertical coercive magnetic force Hc is, the higher the magnetic energy barrier $\Delta E$ is.

In the previously described vertical magnetic recording medium in the prior art, since temperature inside a magnetic recording medium driver rises, not only does thermal energy kT increase, but also a magnetic energy barrier ΔE dependent on vertical coercive magnetic force Hc decreases due to a decrease of vertical coercive magnetic force and the phenomenon of thermal magnetic relaxation easily occurs at higher temperature.

As clearly seen from the previous illustration, in the vertical magnetic recording medium 100 in the prior art, the vertical coercive magnetic force Hc in the vertical magnetic recording layer 104 decreases with heat causing a temperature rise so that the magnetization condition is destabilized. Then, such decrease of the coercive magnetic force caused by heat is also problematic in a magnetic recording medium for another magnetic recording method.

DISCLOSURE OF THE INVENTION

Therefore, it is an object of the present invention to provide a magnetic recording medium capable of attaining high density using a magnetic material that is thermally stabilized by an increase of coercive magnetic force in a recording magnetic layer with temperature rise.

The object can be achieved by a magnetic recording medium comprising a recording magnetic layer in which magnetic recording is carried out, wherein the recording magnetic layer is set such that coercive magnetic force increases with temperature rise within an operating temperature range in which the magnetic recording medium is used.

In the above mentioned invention, the magnetic recording medium is used in the magnetic recording medium driver and, as the temperature inside the driver rises, accordingly the coercive magnetic force in the recording magnetic layer increases. Hence, the coercive magnetic force in the recording magnetic layer increases with temperature rise to stabilize recording magnetization, contrary to the prior art. Therefore, miniaturization and homogenization of the recording magnetic layer can be achieved and a high-density magnetic recording medium can be provided.

In the present specification, the operating temperature is a temperature at which a magnetic recording medium is used in a magnetic recording medium driver. A supposed operating temperature range is different, dependent on the environment in which a magnetic recording medium is used. For example, when a magnetic recording medium driver is used in the environment in which room temperature is supposed to be 15 through 30° C., there is a possibility that temperature inside the driver rises to approximately 70 through approximately 80° C. as this room temperature is a lower limit. Therefore, in the above case, a temperature range from room temperature at time of starting of a magnetic recording medium driver to higher temperature during driving, for example, 15° C. through 80° C., is the operating temperature range of the magnetic recording medium.

Herein, an upper limit of the temperature range is generally called a guaranteed temperature in terms of guaranteeing the function (of maintaining recording magnetization) when a magnetic recording material is used in a magnetic recording medium driver at higher temperature. Similarly, as use of a magnetic recording medium in an environment at lower temperature is supposed, guaranteed temperature at the low temperature side may be defined as a lower limit of operating temperature.

Furthermore, the object can be achieved by a magnetic recording medium comprising a recording magnetic layer in which magnetic recording is carried out, wherein the recording magnetic layer comprises an N-type Ferrimagnetic material and compensation temperature of the N-type Ferrimagnetic material is made to be higher than an operating temperature range in which the magnetic recording medium is used.

In the above mentioned invention, the operating temperature at which a magnetic recording medium is used is lower than compensation temperature Tcomp, however, as temperature inside a magnetic recording medium driver rises, the operating temperature approaches the compensation temperature Tcomp. At this compensation temperature Tcomp, coercive magnetic force of a recording magnetic layer becomes infinite resulting from a property of an N-type Ferrimagnetic material. Hence, the more operating temperature rises and approaches compensation temperature Tcomp, the stronger the coercive magnetic force becomes.

Since coercive magnetic force becomes stronger as temperature rises, recording magnetization can be stably maintained. Hence, it becomes possible to miniaturize and homogenize a recording magnetic layer, or to eliminate magnetic interaction between magnetic particles to provide a high-density magnetic recording medium.

Then, as the N-type Ferrimagnetic material has a configuration of comprising an amorphous alloy in which at least one selected from the rare earth element group consisting of gadolinium (Gd), terbium (Tb), neodymium (Nd), praseodymium (Pd), dysprosium (Dy), holmium (Ho) and erbium (Er), and at least one selected from the transition metal element group consisting of iron (Fe), cobalt (Co) and nickel (Ni) are combined, a magnetic recording medium using a more preferred vertical magnetic recording method can be formed.

Herein, by appropriately combining the rare earth element and the transition metal element, many N-type Ferrimagnetic materials can be designed such that vertical coercive magnetic force Hc of a recording magnetic layer becomes stronger as temperature rise. Also, although an appropriate selection should be made in order to obtain an N-type Ferrimagnetic material satisfying a necessary condition, it is preferable that at least one of gadolinium and terbium should be selected from the rare earth element group and at least one of iron and cobalt should be selected from the transition metal element group.

Then, the N-type Ferrimagnetic material can be made to have a configuration of having a composition proportion of the rare earth element such that the compensation temperature is made to be higher than the operating temperature range. Compensation temperature Tcomp of an N-type Ferrimagnet material can be changed by adjusting the composition, and when the composition proportion of the rare earth element is high, compensation temperature Tcomp can be made to be higher than the operating temperature at which a vertical magnetic recording medium is used.

Herein, operating temperature of a magnetic recording medium according to the present invention can be set at 0° C. through 80° C. As described above, operating temperature is a temperature at which a magnetic recording medium can be used inside a magnetic recording medium driver. An operating temperature range is appropriately set, taking the environment in which a magnetic recording medium is used into consideration. There is a setting of lower or higher temperature side, or a setting of width of operating temperature range, etc. Generally, from 0° C. regarded as a guaranteed temperature at lower limit side to 80° C. regarded as a guaranteed temperature of an upper limit side is the widest operating temperature range, and when a magnetic recording medium is designed, the operating temperature range is decided within this widest operating temperature range. Then, the compensation temperature should be higher than the operating temperature range set herein.

Also, a magnetic recording medium driver comprising the magnetic recording medium and a magneto resistive head is included in the present invention. Since the magnetic recording medium in which coercive magnetic force in a recording magnetic layer increases with temperature rise is comprised and this medium can be read by means of a high sensitivity magneto resistive head, magnetic recording information can be reproduced exactly and sensitively.

BEST MODE FOR EMBODYING THE INVENTION

The contents of the present invention will be illustrated in more detail based on the drawings below. Herein, although the present invention is a technique effective for a magnetic recording medium on which recording is performed by means of various recording methods including a vertical magnetic recording method, an embodiment with respect to a vertical magnetic recording medium will be shown below as a preferred embodiment.

Figure 4:
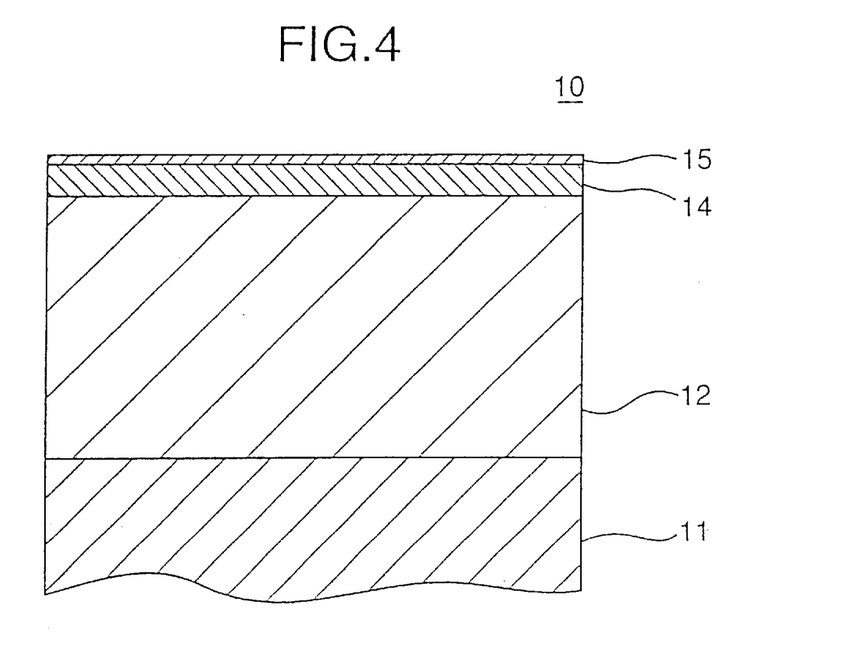
FIG. 4 is a diagram showing a schematic configuration of a vertical magnetic recording medium to which the present invention is applied.

FIG. 4 is a diagram showing a schematic configuration of a vertical magnetic recording medium 10 to which the present invention is applied.

As for the vertical magnetic recording medium 10, a non-magnetic substrate 11 consisting of an aluminum alloy, etc. can be employed. The substrate material is not limited to an aluminum alloy, etc., and otherwise a ceramic material such as glass, etc., or an organic material such as polycarbonate etc., may be employed.

On the substrate 11, an underlying layer 12 consisting of a soft magnetic material such as cobalt-zirconium-niobium (Co—Zr—Nb), nickel-iron (Ni—Fe), Iron-tantalum-carbon (Fe—Ta—C), or iron-silicon-aluminum (Fe—Si—Al), etc., may be formed. This underlying layer 12 is formed with layer thickness of, for example, 200 nm through 1000 nm. As for this soft magnetic material, otherwise, a cobalt-based, iron-based or nickel-based alloy can be employed similarly.

By establishing this underlying layer 12, recording sensitivity of the vertical magnetic recording medium 10 can be improved. However, the underlying layer 12 is not essential as a layer constituting the vertical magnetic recording medium 10 and may be omitted.

On the underlying layer 12, a vertical magnetic recording layer 14 is formed as a recording magnetic layer consisting of an N-type Ferrimagnet material in which vertical magnetic recording is performed. This N-type Ferrimagnet material is an amorphous alloy in which a rare earth element and a transition metal element are combined. As for a rare earth element, gadolinium, terbium, neodymium, praseodymium, dysprosium, holmium and erbium can be employed. Also, as for a transition metal element, iron, cobalt and nickel can be employed. Although an amorphous alloy can be formed by appropriately selecting from the rare earth elements and the transition metal elements, it is preferable that iron or cobalt from the transition metal element group and terbium or gadolinium from the rare earth element group be selected and contained.

An N-type Ferrimagnet material according to the present invention is set such that compensation temperature Tcomp is higher than an operating temperature range of a vertical magnetic recording medium. For this purpose, adjustment is performed such that a composition proportion of a rare earth element becomes high. The compensation temperature Tcomp can be changed by adjusting the composition of the N-type Ferrimagnet material. Specifically, as the composition proportion of the rare earth element is increased, setting can be made such that the compensation temperature Tcomp is higher than an operating temperature range and vertical coercive magnetic force Hc in the recording magnetic layer can be made to increase with temperature rise.

On the vertical magnetic recording layer 14, a protecting layer 15 consisting of DLC or yttrium-silicon dioxide ($Y$—$SiO_2$), etc. is formed.

Figure 5:
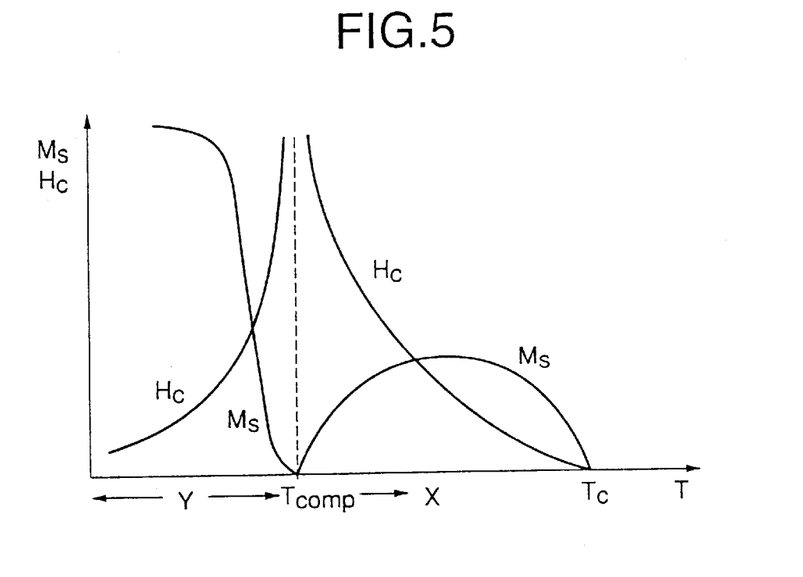
FIG. 5 is a diagram showing relationships between temperature and vertical coercive magnetic force Hc and between temperature and residual magnetization Ms with respect to N-type Ferrimagnet materials.

Herein, a property of the N-type Ferrimagnet material will now be described in detail. FIG. 5 is a diagram showing relationships between temperature T and vertical coercive magnetic force Hc and between temperature T and residual magnetization Ms with respect to N-type Ferrimagnet materials.

An N-type Ferrimagnet material is an amorphous alloy in which a rare earth element such as terbium, etc. described above and a transition metal element such as iron, etc. are bonded to be in an anti-parallel (Ferri) state. This N-type Ferrimagnet material has Curie temperature Tc, at which the material becomes non-magnetic, and compensation temperature Tcomp lower than this Curie temperature. Although a theoretical explanation is omitted, at this compensation temperature Tcomp, two values of mutually opposing magnetization become equal and magnetization (Ms) is apparently disappeared such that vertical coercive magnetic force Hc diverges to become infinite. Then, above this compensation temperature Tcomp, vertical coercive magnetic force Hc decreases as the temperature approaches the Curie temperature and the force becomes zero at the Curie temperature.

By the way, in the prior art, an N-type Ferrimagnet material having the property as described above has been employed generally as a magneto-optical recording material. A property required for this magneto-optical recording material is that the coercive magnetic force Hc be sufficiently lowered to near or zero when the material is heated by means of laser radiation, to enable magnetic recording to a magneto-optical material. As illustrating with reference to FIG. 5, there is an X-side region in which coercive magnetic force Hc decreases when temperature is raised by heating. In the case of a magneto-optical recording material, an N-type Ferrimagnet material has been designed so that an operating temperature range of a vertical magnetic recording medium exists within this region X. With respect to an N-type Ferrimagnet material designed such that compensation temperature Tcomp is near room temperature (or temperature at the lower limit of an operating temperature range), vertical coercive magnetic force in a recording magnetic layer can be decreased with temperature rise as the material is used inside a magnetic recording medium driver. That is, in a magneto-optical material, a property of an N-type Ferrimagnet material of which vertical coercive magnetic force Hc decreases with temperature rise has been utilized.

However, in the present invention, operating temperature of a vertical magnetic recording medium is set within a region Y shown in FIG. 5 or a region in which a property of an N-type Ferrimagnet material is opposed to the case of being utilized in the magneto-optical recording material. In the present invention, vertical coercive magnetic force Hc increases with temperature rise within a temperature range in which the vertical magnetic recording medium is used. Then, compensation temperature Tcomp of an N-type Ferrimagnet material is higher than the temperature range Y. For example, when guaranteed temperature that may guarantee a function of the vertical magnetic recording medium is approximately 70° C., if the compensation temperature Tcomp is made to be higher than 70° C., the medium is in a state in which vertical coercive magnetic force Hc increases with temperature rise within the operating temperature range.

The compensation temperature Tcomp can be set when the composition proportion of a rare earth element in an N-type Ferrimagnet material is adjusted to be high. In an N-type Ferrimagnet material according to the present invention, composition proportion of a rare earth element is higher than that of the N-type Ferrimagnet material conventionally used in a magneto-optical recording material. Although in terbium-iron-cobalt (Tb—FeCo) used in a magneto-optical recording material in the prior art, composition proportion of terbium is approximately 24%, in the case of the present invention, composition proportion of terbium is, for example, approximately 28% so that the composition proportion of the rare earth element is high.

Figure 6:
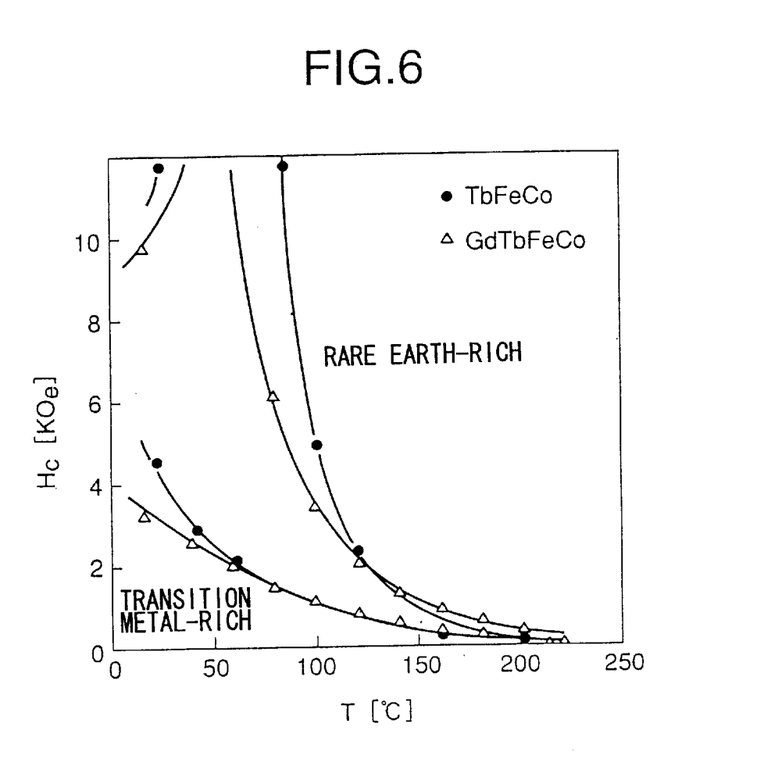
FIG. 6 is a diagram illustrating temperature dependence on vertical coercive magnetic force of N-type Ferrimagnet materials.

FIG. 6 is a diagram illustrating temperature dependence on the vertical coercive magnetic force of N-type Ferrimagnet materials. For each of a terbium-iron-cobalt (Tb—Fe—Co) film and a gadolinium-terbium-iron-cobalt (Gd—Tb—Fe—Co) film, a rare earth-rich state in which composition proportion of a rare earth element is high such as approximately 27%, and a transition metal-rich state in which a transition metal element is much and a composition proportion of a rare earth element is low such as approximately 15% are shown. With respect to the transition metal-rich one, vertical coercive magnetic force Hc monotonically decreases with temperature rise. On the other hand, with respect to the rare earth-rich one, the property of vertical coercive magnetic force Hc increasing with temperature rise from approximately 15° C. that is included in the lower side of the operating temperature range of the vertical magnetic recording medium, can be confirmed.

Hence, it is possible to select the rare earth-rich terbium-iron-cobalt film and the gadolinium-terbium-iron-cobalt film illustrated herein in which composition proportion of rare earth element(s) is approximately 27%, as one of magnetic materials used in the vertical magnetic recording layer 14 according to the present invention.

Herein, in the case of FIG. 6, compensation temperature Tcomp is approximately 15° C. for the gadolinium-terbium-iron-cobalt film and compensation temperature Tcomp is approximately 75° C. for the other terbium-iron-cobalt film. As over 70° C. is generally regarded as preferable for the guaranteed temperature of a vertical magnetic recording medium, in this example, the terbium-iron-cobalt is preferred as the N-type Ferrimagnet material used in a vertical magnetic recording layer 14.

Figure 7:
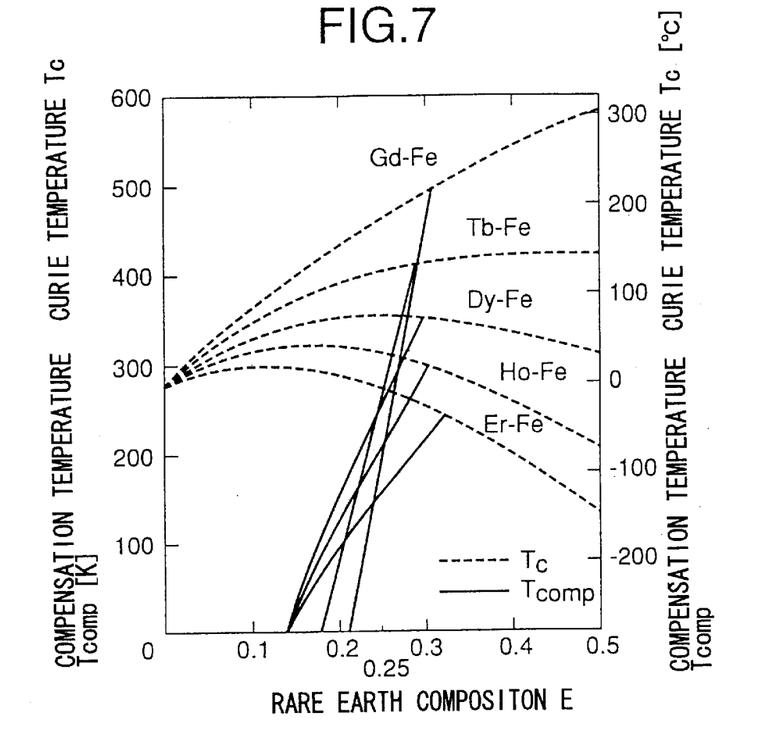
FIG. 7 is a diagram showing a relationship between composition of a rare earth E and compensation temperature Tcomp or Curie temperature Tc with respect to N-type Ferrimagnet materials.

FIG. 7 is a diagram showing a relationship between composition of a rare earth E (gadolinium, terbium, dysprosium, holmium and erbium) and compensation temperature Tcomp or Curie temperature Tc with respect to N-type Ferrimagnet materials. Curie temperature is indicated with the broken line. In the gadolinium-iron and terbium-iron, as the composition proportion of the rare earth element is increased, the Curie temperature Tc of over 100° C. can be attained.

Also, compensation temperature Tcomp is indicated with solid lines. When compositions of the rare earth element in gadolinium-iron, terbium-iron and dysprosium-iron are over 0.25 (composition proportion of 25%), compensation temperatures Tcomp equal to or more than 0° C. can be set. When it is desired that an operating temperature range of a vertical magnetic recording medium is set at, for example, 20 through 70° C., it can be confirmed that the composition of a rare earth element should be adjusted such that compensation temperature Tcomp becomes approximately 70° C.

Figure 8:
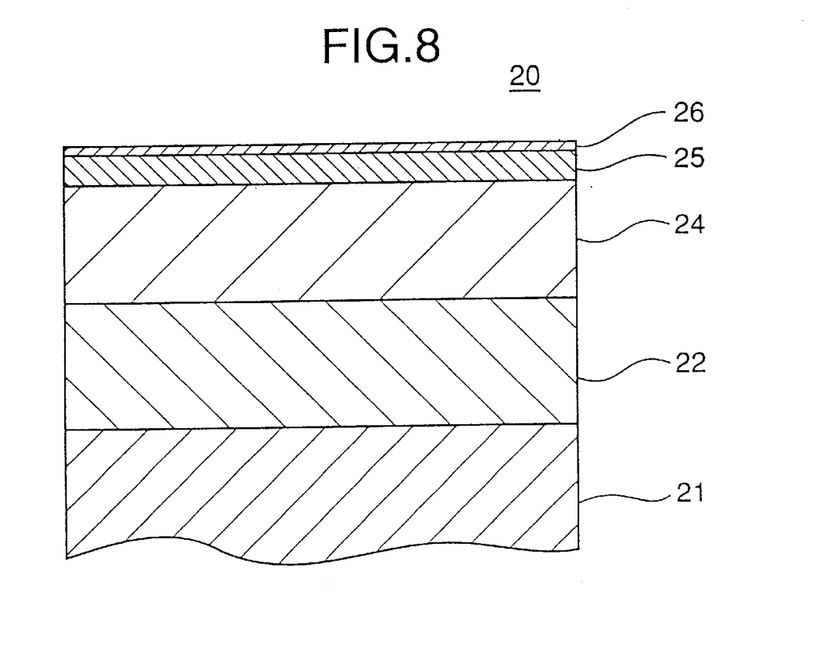
FIG. 8 is a diagram showing a schematic configuration of a general vertical magnetic recording medium in the embodiment of the present invention.

A vertical magnetic recording medium 20 of the embodiment of which the schematic configuration is shown in FIG. 8 was produced taking the detailed points described above into consideration.

An aluminum board having a diameter of 3.5 inches and a film thickness of 0.8 mm was employed as a substrate 21 of the vertical magnetic recording medium 20. The vertical magnetic recording medium 20 according to the present embodiment had a single magnetic layer configuration not having the soft magnetic underlying layer 12 of the basic vertical magnetic recording medium 10 previously shown in FIG. 4.

A vertical magnetic recording medium 24 was formed of a rare earth-rich terbium-iron-cobalt ($Tb_{29}$—$Fe_{60}$—$Co_{11}$, the numerical values indicate atom %) with the thickness of approximately 40 nm. Herein, in order to prevent the terbium-iron-cobalt from oxidization, a sandwich structure was made such that the medium was sandwiched with silicon nitride (SiN). Specifically, silicon nitride of 30 nm as a downside-protecting layer 22 was formed on the aluminum substrate 21, terbium-iron-cobalt ($Tb_{29}$—$Fe_{60}$—$Co_{11}$) was formed on it, and silicon nitride of 7 nm as an upside-protecting layer 25 was formed on it. Then, finally DLC of approximately 3 nm as a carbon-based protecting layer 26 was formed to make the finished vertical magnetic recording medium 20. A fluorine-based lubricant was applied on the vertical magnetic recording medium 20.

Although the vertical coercive magnetic force Hc of the vertical magnetic recording layer 24 was approximately 2800 Oe at room temperature (approximately 25° C.), the force increased to approximately 3400 Oe at 65° C.

The vertical magnetic recording medium 20 can be produced by a sputter method using a magnetron sputter apparatus. Without heating the substrate 21, the films of the downside-protecting layer 22, the vertical magnetic recording layer 24, the upside-protecting layer 25 and the carbon-based protecting layer 26 may be formed in order. Herein, Argon (Ar) was employed in the sputter. However, when the nitride films as the downside-protecting layer 22 and upside-protecting layer 25 were formed, nitrogen gas ($N_2$) was introduced at the same time to carry out a reactive sputter.

Figure 9:
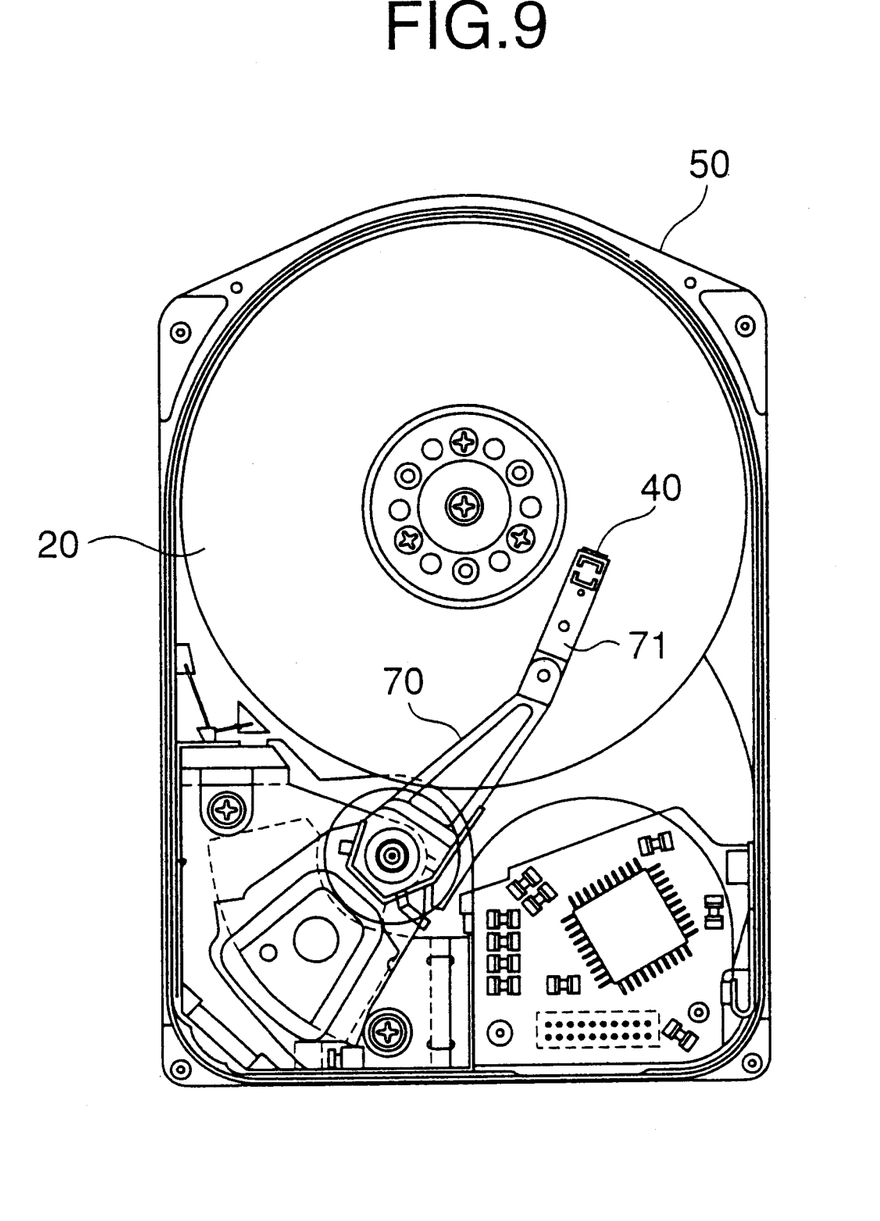
FIG. 9 is a diagram showing a schematic configuration of a magnetic recording medium driver mounting a vertical magnetic recording medium in the embodiment.

Subsequently, in order to evaluate recording and reproducing properties of the vertical magnetic recording medium 20, the medium was mounted on a magnetic recording medium driver 50 shown in FIG. 9 and was used. The magnetic recording medium driver 50 has a merge-type giant magneto resistive (GMR) head 40 for vertical magnetic recording to and reproducing from the vertical magnetic recording medium 20. The vertical magnetic recording medium 20 according to the present embodiment as a hard disk is mounted on the magnetic recording medium driver 50 and made so as to be able to be rotated. Magnetic recording and reproducing operations are carried out by the merge-type magnetic head 40 at a certain amount of float, facing a surface of the hard disk 20. The merge-type head 40 is fixed at a front end of a slider 71 set on an arm 70. For positioning the merge-type magnetic head 40, a two-staged actuator in which a normal actuator and an electromagnetic small amplitude actuator are combined is employed.

Herein, in the merge-type magnetic head 40, track width between magnetic poles for recording was approximately 0.6 $\mu$m and gap length was approximately 0.2 $\mu$m, and also track width of GMR for reproducing was approximately 0.45 $\mu$m and gap length was approximately 0.12 $\mu$m. Also, the rotational frequency of the vertical magnetic recording medium 20 was set at 4800 rpm.

At room temperature (approximately 25° C.), when a signal of 300 kFCI (Flux Change per Inch) was recorded, S/N ratio (Signal to Noise Ratio) was 21 dB. Recording current Iw at this time was 20 mA and an overwrite property (O/W) indicated a good value equal to or less than −40 dB. Furthermore, when 3 hours had passed after recording, S/N ratio was 20.8 dB and damping of a recording mark was not observed.

Next, the neighborhood of the magnetic head in the machine for evaluating recording and reproducing properties was maintained at approximately 65° C. and recording and reproducing were carried out. When a signal of 300 kFCI was recorded, S/N ratio was 21.4 dB. As recording current Iw was made to be 30 mA, the O/W property indicated a value better than −40 dB. Herein, as to the reason why the S/N ratio became better than that of the case of recording at ordinary temperature, increase of vertical coercive magnetic force Hc of the vertical magnetic recording layer 24 is given. Furthermore, when 3 hours had passed after recording, S/N ratio was 21.4 dB and damping of a recording mark was not observed.

As made clear from the above description, even if the vertical magnetic recording medium 20 according to the embodiment is at high temperature, the coercive magnetic force does not decrease but conversely increases. Hence, high density can be achieved by miniaturization and homogenization of a recording magnetic layer or by elimination of magnetic interaction between magnetic particles. The magnetic recording medium driver 50 using such vertical magnetic recording medium 20 is an apparatus capable of sensitively recording and reproducing magnetic information.

Although the preferred embodiment according to the present invention is illustrated above, the present invention is not limited to such particular embodiment and various alterations and modifications can be carried out within the scope of the present invention described in the claims.

Regardless of the embodiment, an N-type Ferrimagnet material usable for a vertical magnetic recording material is an amorphous alloy in which a rare earth element and a transition metal element are combined. An amorphous alloy, in which the vertical coercive magnetic force Hc increases with temperature rise within a temperature range intended for use of a vertical magnetic recording medium, should be designed by appropriately combining gadolinium, terbium, neodymium, praseodymium, dysprosium, holmium and erbium as a rare earth element and iron, cobalt and nickel as a transition metal element.

Also, although the magnetic recording medium using a vertical magnetic recording method has been illustrated in the embodiment, but not limited to this, the present invention can also be similarly applied to a magnetic recording medium using another magnetic recording method.

What is claimed is:

1. A magnetic recording medium for vertically magnetic recording, said medium comprising a magnetic recording layer in which magnetic recording is carried out, wherein:

said magnetic recording layer comprises an N-type Ferrimagnetic material;

said N-type Ferrimagnetic material includes an amorphous alloy consisting of at least one element selected from rare-earth elements and at least one element selected from transition metal elements; and a composition proportion of said at least one element selected from rare-earth elements in said amorphous alloy is adjusted such that a compensation temperature of said N-type Ferrimagnetic material is higher than an operating temperature range in which said magnetic recording layer is actually used;

wherein said magnetic recording layer is set such that coercive magnetic force increases with temperature rise within the Operating temperature range, and wherein said operating temperature range is approximately 0° C. through 80° C.

2. The magnetic recording medium as claimed in claim 1, wherein:

said rare-earth elements comprise gadolinium (Gd), terbium (Tb), dysprosium (Dy), holmium (Ho) and erbium (Er); and said transition metal elements comprise iron (Fe), cobalt (Co) and nickel (Ni).

3. The magnetic recording medium as claimed in claim 1, wherein:

said rare-earth elements comprise gadolinium (Gd) and terbium (Tb); and said transition metal elements comprise iron (Fe) and cobalt (Co).

4. A magnetic recording medium driver comprising:

a magnetic recording medium for vertically magnetic recording, said magnetic medium including a magnetic recording layer in which magnetic recording is carried out; and a magnetic resistive head for recording information to said magnetic recording medium and reproducing information from said magnetic recording medium, wherein:

said magnetic recording layer comprises an N-type Ferrimagnetic material;

said N-type Ferrimagnetic material includes an amorphous alloy consisting of at least one element selected from rare-earth elements and at least one element selected from transition metal elements; and a composition proportion of said at least one element selected from rare-earth elements in said amorphous alloy is adjusted such that a compensation temperature of said N-type Ferrimagnetic material is higher than an operating temperature range in which said magnetic recording layer is actually used;

wherein said magnetic recording layer is set such that coercive magnetic force increases with temperature rise within the operating temperature range, and wherein said operating temperature range is approximately 0° C. through 80° C.

* * * * *

UNITED STATES PATENT AND TRADEMARK OFFICE
CERTIFICATE OF CORRECTION

PATENT NO. : 6,720,075 B2
DATED : April 13, 2004
INVENTOR(S) : Ikuya Tagawa et al.

It is certified that error appears in the above-identified patent and that said Letters Patent is hereby corrected as shown below:

Column 10,
Line 42, delete "Operating" and insert -- operating -- therefor.
Line 44, delete "C." and insert -- C -- therefor.

Column 12,
Line 7, delete "C." and insert -- C -- therefor.

Signed and Sealed this

Fourteenth Day of December, 2004

JON W. DUDAS
*Director of the United States Patent and Trademark Office*